United States Patent Office 3,500,240
Patented Mar. 10, 1970

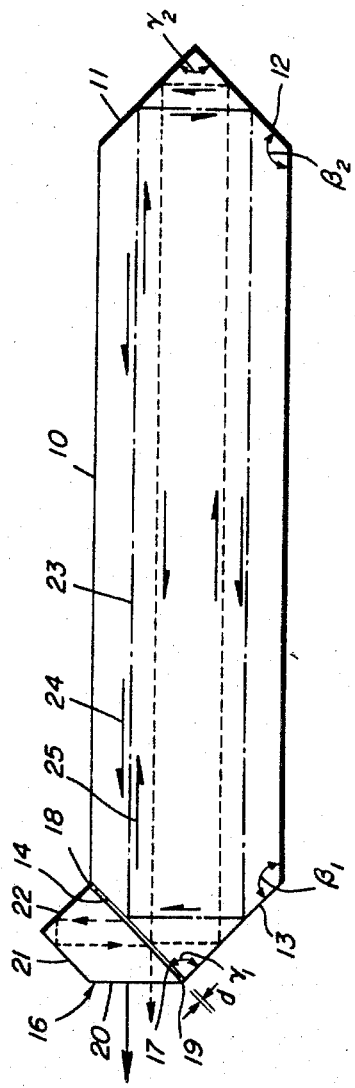

3,500,240
SIMPLE TRAVELING WAVE LASER USING TOTAL - INTERNAL - REFLECTION RESONATOR
Bernard V. Kessler, Takoma Park, Md., assignor to the United States of America as represented by the Secretary of the Navy
Filed Nov. 30, 1964, Ser. No. 414,924
Int. Cl. H01s *3/05*
U.S. Cl. 331—94.5    6 Claims

ABSTRACT OF THE DISCLOSURE

An optical maser system which utilizes a total-internal-reflection resonator in which oscillation begins in circulatory counter-rotating modes and in which energy is coupled from one such mode into a competing, oppositely rotating mode such that the former has less gain and the latter more gain per round trip, with the result that only the mode with greater gain appears in the output of the system.

---

The invention described herein may be manufactured and used by or for the Government of the United States of America for governmental purposes without the payment of any royalties thereon or therefor.

This invention relates to the art of optical masers. More particularly, it relates to a traveling wave, total-internal-reflection resonator for an optical maser.

In optical masers as heretofore described, oscillation takes place in spatially fixed standing wave patterns, because of the superposition of waves of equal frequency and amplitude traveling in opposite directions. In a system of this kind, the emission induced by the standing wave is zero at the nodal planes and at a maximum in between. There results, therefore, an inverted population that has maxima at the nodal planes and minima in between. This population distribution is an unfavorable distribution for supporting the mode which produced it, since in places where the electric field is maximum, there is a minimum density of inverted states. Another mode, for which the population distribution is more favorable, will come into dominance. Tang et al. have suggested, in vol. 34 of Journal of Applied Physics at page 2289, August 1963, that this problem can be solved by providing a laser with circulatory counter-rotating modes of oscillation and then suppressing the oscillation in one of the counter-rotating modes. In this manner, single axial mode oscillation is achieved. A traveling wave is established which de-excites the excited chromium ions in a spatially uniform manner, thus precluding the existence of any different axial modes. The Tang et al. system is complex and cumbersome, however, in that it requires magnets, polarizers, four mirrors and a polarization rotator. Optical alignment and adjustment of all these parts is difficult. The present invention eliminates most of these disadvantages while providing similar, traveling wave operation.

It is thus the object of this invention to provide an optical maser structure in which a traveling wave is established, with all the attendant advantages of such operation, and in which this result is achieved in much simpler manner than in the prior art.

Briefly described, the invention resides in the provision of a system in which oscillation begins in circulatory counter-rotating modes and in which energy is coupled from one such mode into a competing, oppositely rotating mode such that the former has less gain and the latter more gain per round trip, with the result that only the mode with the greater gain appears in the output. In its preferred embodiment, the invention utilizes a total-internal-reflection resonator similar to that described by Bergstein et al. in vol. 50 of the Proceedings of the IRE (correspondence), page 1833, 1962. This prior resonator employs total-internal-reflection to reflect the light beam and frustrated total reflection for output coupling. In this way, it eliminates multiple layer dielectrics or metallic coating end mirrors, which are often damaged by exposure to the intense pump light or by the laser output itself. Total-internal-reflection has the further advantage of providing higher reflectivities and lower losses.

The Bergstein et al. resonator is a ruby rod having 90° roof prisms at each end thereof. The laser light follows rectangular paths, as established by reflection from the roof prism faces. Power is extracted from the resonator by means of frustrated total reflection, that is, by coupling to the rapidly decaying fields in the optically rarer medium surrounding the laser material by placing the hypotenuse of a 45°–45°–90° prism parallel and in close proximity to one of the totally reflecting end walls. The condition for frustrating the total-internal-reflection at this face is:

$$n_2 < n_1 \sin \alpha_1 < n_3 \qquad (1)$$

where $\alpha_1$ is the angle of incidence of the beam in the laser material, $\pi/4$ in this situation; $n_1$ is the refractive index of the laser material, equal to about 1.7 for ruby; $n_2$ is the refractive index of the coupling layer, 1.0 for air, for example; and $n_3$ is the refractive index of the coupling prism.

The Bergstein et al. resonator oscillates in two contra-directionally traveling wave systems as the dominant modes, the two modes having equal gain. In accordance with the present invention, the output coupling prism is provided with a means for reflecting and returning one of the counter-rotating modes back into the laser material. Energy is thereby coupled from one mode into the opposite rotating mode, with the result that after the first round-trip the former has less gain and the latter more gain. According to the Wagner-Birnbaum condensation theorem, the mode with greater gain will grow at the expense of the mode with lesser gain with the result that only the mode with the greater gain will appear in the output. See vol. 32, Journal of Applied Physics, page 1185, 1961.

The total-internal-reflection resonator of the present invention is shown in the single figure of the drawing as consisting of a body of active laser material 10, having prism faces 11, 12, 13, and 14 ground thereon. Angles $\beta_1$ and $\beta_2$ are 135° and angles $\gamma_1$ and $\gamma_2$ are 90° so that each of the prism faces of each pair is disposed at 90° to the other face of the pair and at 90° to one of the faces of the other pair. This establishes an angle of incidence of 45° between the prism faces and rays traveling parallel to the longitudinal axis of the device to produce the circulatory modes suggested by the dash-dot lines of the figure. Supported adjacent face 14 is a coupling prism 16, face 17 of coupling prism 16 being supported parallel to and at a distance $d$ from face 14 by means of spacer elements 18 and 19. The amount of power transmitted is a function of distance $d$. In the preferred embodiment, the body 10 is a pink ruby, the coupling prism 16 is of ruby or sapphire, and the coupling layer between the surfaces 14 and 17 is air, but it should be understood that any other materials can be employed as long as the inequality (1) above is maintained. Coupling prism 16 is provided with an output face 20 and also has a reflecting means consisting of, in this embodiment, a 90° roof prism defined by faces 21 and 22 ground thereon.

It is an essential feature of the present invention that the material of the laser body 10 be able to frustrate a ray in the coupling prism 16. This is the reason for giving ruby and sapphire as the examples of suitable materials for the coupling prism. It should be clear that the condition for frustrated total-internal-reflection in the coupling prism is satisfied for these materials. Whatever materials are employed, it should be understood that the refractive indeces of the materials must satisfy both inequality (1) above and the inequality:

$$n_2 < n_3 \sin \alpha_3 < n_1 \qquad (2)$$

where $\alpha_3$ is the angle of incidence of the beam in the coupling prism.

The operation of the present total-internal-reflection resonator will now be described. When the material of the resonator is pumped, as by a suitable pump lamp not shown, the medium will begin to go into oscillation in counter-rotating modes as described above. Several resonant modes are possible in the configuration shown, but it will be understood by those skilled in the art that a dominant mode will tend to be established in each direction, which modes are both indicated by the dash-dot line 23 and arrows 24 and 25.

Consider the first round trip of the counterclockwise rotating beam as indicated by arrow 24. When this beam reaches surface 14, approximately 20% of the beam is coupled out into the material of the coupling prism, the remaining 80% continuing on in the laser material. The 20% then passes out through surface 20, the output surface. The situation with respect to the clockwise rotating beam, as indicated by the arrow 25, is somewhat different. After reflecting from surface 13 of body 10, this beam reaches surface 14 in the vertical direction and about 20% of it is coupled into the coupling prisms 16. In the coupling prism, this beam meets the roof prism defined by surfaces 21 and 22, which reflect the beam back again toward surface 17. When the beam reaches surface 17, some of it is reflected into the output direction and some of it is coupled back into the body 10 by the phenomenon of frustrated total-internal-reflection, because of the presence of body 10 near coupling prism 16, and because the refractive indices have been selected to meet the above-mentioned relations.

The difference between the present device and that described by Bergstein et al. should now be readily apparent. In a system such as that described by Bergstein et al., the two counter-rotating beams have equal gain and equal loss at the two outputs, such that the operation is balanced and symmetrical for each counter-rotating mode. In the present device, the return of a portion of the energy from one mode into the body in the direction of the competing opposite mode creates a situation in which, after the first round trip, one mode has higher gain than the other. In the embodiment shown, the original counterclockwise mode is the mode which is of higher gain after the first round trip. This mode therefore grows in intensity at the expense of the original clockwise mode in accordance with the Wagner-Birnbaum condensation theorem. The end result is that the clockwise mode disappears and only a traveling wave remains in the body of the laser material 10.

Thus it can be seen that a traveling wave resonator has been described which is simple in construction and efficient in operation, since, as with the Bergstein et al. resonator, dielectric or metal mirrors are avoided. In addition, single axial mode traveling wave oscillation is achieved without the complex apparatus employed by the prior art.

Obviously many variations of the structure are possible in the light of the above teachings. It is therefore to be understood that within the scope of the appended claims, the invention may be practiced otherwise than as herein specifically described.

What is claimed is:
1. A total-internal-reflection resonator for an optical maser comprising:
 a laser crystal of refractive index $n_1$, having a pair of prism faces on each end thereof, each of said prism faces of each pair being disposed at 90° to the other prism face of the pair and at 90° with respect to one of the faces of the other pair,
 a coupling prism of refractive index $n_3$ disopsed adjacent said crystal, said coupling prism having one of its faces parallel to one of said prism faces and displaced therefrom by a predetermined distance, a second output face at 45° to said one prism face, and a reflecting means disposed to reflect a beam traveling parallel to said output face back in the opposite direction, said reflecting means comprises a pair of prism faces disposed at 90° to one another and at 45° to the direction of incidence of said beam, and
 a coupling medium of refractive index $n_2$ in the space between said one prism face and said adjacent coupling prism face,
 the refractive indexes $n_1$, $n_2$ and $n_3$ being chosen to satisfy the relation

$$n_2 < n_1 \sin \alpha_1 < n_3$$

where $\alpha_1$ is the angle of incidence of a ray in said body, as well as the relation $$n_2 < n_3 \sin \alpha_3 < n_1$$

where $\alpha_3$ is the angle of incidence of a ray in said coupling medium.

2. A total-internal-reflection resonator for a laser, comprising:
 a laser crystal having a plurality of prism faces thereon, said prism faces oriented to establish first and second circulatory counter-rotating resonant modes within said laser crystal through total internal reflection,
 said first and second modes initially having substantially equal gain;
 a coupling prism disposed adjacent said laser crystal, said coupling prism comprising,
  a first face parallel to one of said prism faces of said laser crystal for frustrating the total internal reflection of said laser crystal,
  a second face at 45° to said first face for permitting energy output from said laser crystal; and,
  a roof prism perpendicular to said second face for reflecting energy beams traveling parallel to said second face,
 said roof prism causing the gain of one of said first and second circulatory counter-rotating modes to be gradually transferred to the other.

3. The total-internal-reflection resonator of claim 2 wherein said laser crystal is ruby, and said coupling prism is ruby.

4. The total-internal-reflection resonator of claim 2 wherein said laser crystal is ruby and said coupling prism is sapphire.

5. An optical maser resonator as defined in claim 1 wherein
 said laser crystal is ruby,
 said coupling prism is ruby, and
 said coupling layer is air.

6. An optical maser resonator as defined in claim 1 wherein
 said laser crystal is ruby,
 said coupling prism is sapphire, and
 said coupling layer is air.

References Cited

UNITED STATES PATENTS

| 3,308,395 | 3/1967 | Sorokin | 331—94.5 |
| 3,323,411 | 6/1967 | Killpatrick | 331—94.5 |

FOREIGN PATENTS

| 1,362,805 | 4/1964 | France. | |

RONALD L. WIBERT, Primary Examiner